United States Patent
Murphy et al.

(10) Patent No.: US 7,806,007 B2
(45) Date of Patent: Oct. 5, 2010

(54) DETERMINING SEAT BELT TENSION IN A MOTORIZED SEAT BELT APPARATUS

(75) Inventors: Morgan D. Murphy, Kokomo, IN (US); Kevin J. Hawes, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 68 days.

(21) Appl. No.: 12/288,145

(22) Filed: Oct. 16, 2008

(65) Prior Publication Data

US 2010/0095787 A1  Apr. 22, 2010

(51) Int. Cl.
  *G01L 1/26* (2006.01)
(52) U.S. Cl. ............................. 73/862.391; 73/862.381
(58) Field of Classification Search ..... 73/862.381–391
  See application file for complete search history.

(56) References Cited

U.S. PATENT DOCUMENTS

| | | | | |
|---|---|---|---|---|
| 4,655,312 A | * | 4/1987 | Frantom et al. | 180/268 |
| 5,005,777 A | * | 4/1991 | Fernandez | 242/390.2 |
| 5,558,370 A | | 9/1996 | Behr | |
| 5,806,148 A | * | 9/1998 | McFalls et al. | 24/168 |
| 6,976,708 B2 | * | 12/2005 | Aoki et al. | 280/807 |
| 7,180,258 B2 | * | 2/2007 | Specht et al. | 318/432 |
| 7,237,640 B2 | * | 7/2007 | Tobata | 180/268 |
| 7,416,149 B2 | * | 8/2008 | Koide et al. | 242/374 |
| 7,431,340 B2 | * | 10/2008 | Midorikawa | 280/806 |
| 2002/0024211 A1 | | 2/2002 | Yano et al. | |
| 2004/0226767 A1 | | 11/2004 | Martinez et al. | |
| 2004/0232268 A1 | | 11/2004 | Karwaczynski | |
| 2006/0043724 A1 | | 3/2006 | Stanley | |

FOREIGN PATENT DOCUMENTS

| | | |
|---|---|---|
| EP | 1498325 | 6/2004 |
| EP | 1803616 | 12/2006 |
| WO | PCT/SE99/00571 | 8/1999 |

* cited by examiner

*Primary Examiner*—Max Noori
(74) *Attorney, Agent, or Firm*—Thomas N. Twomey

(57) ABSTRACT

A method and apparatus is provided for determining seat belt tension in a seat belt system. The apparatus includes webbing and a motor coupled to the webbing for retracting the webbing and generating a seat belt tension. When the seat belt apparatus is deployed to restrain an occupant, the tension on the seatbelt is monitored by applying a voltage to the motor to retract the webbing, measuring an electrical current during the application of the voltage, determining a maximum value of the electrical current and determining the seat belt tension based upon the maximum value.

11 Claims, 2 Drawing Sheets

US 7,806,007 B2

DETERMINING SEAT BELT TENSION IN A MOTORIZED SEAT BELT APPARATUS

TECHNICAL FIELD OF INVENTION

The invention relates to seat belt assemblies comprising a webbing and a motor for retracting the webbing and generating a seat belt tension on the webbing. More particularly, this invention relates to such seat belt assemblies wherein the seat belt tension on the webbing is determined by measuring maximum motor current.

BACKGROUND OF INVENTION

It is known to deploy airbags to protect seat occupants in a collision event. It is desirable to optimize the deployment force of an airbag based on a determination that the seat is occupied by a large person, a small person, or a child seat. For example, it is proposed that the airbag deploys with normal force when the seat is occupied by a large person, deploys with reduced force when the seat is occupied by a small person, and does not deploy if a child seat is present in the seat. Some airbag controllers determine optimum deployment based upon a measured weight of the seat occupant. It is proposed that airbag controllers measuring the weight of the seat occupant perform a correction for seat belt tension in the determination process. For this purpose, it is proposed to provide a seat belt tension sensor within a seat belt assembly, typically within or connected to the buckle. However, including a separate tension sensor to determine seat belt tension undesirably adds cost and complexity to the seat belt assembly.

One type of seat belt assembly includes a retractor motor for retracting webbing and establishing a seat belt tension on the webbing. It is proposed to estimate seat belt tension by applying a voltage to the retractor motor, monitor the retractor motor for movement with a motor motion sensor, and estimate seat belt tension. Knowledge of motor motion is useful for estimating seat belt tension. However, including a separate motion sensor undesirably adds cost and complexity to the seat belt assembly.

What is needed is a reliable measure of a seat belt tension on a webbing in a seat belt assembly that includes a retractor motor which does not require a separate tension sensor or motor motion sensor, and thereby reduces the cost and complexity associated with determining seatbelt tension in a seat belt assembly.

SUMMARY

In accordance with this invention, a method is provided for determining seat belt tension in a seat belt apparatus that includes a webbing and a motor coupled to the webbing. The motor retracts the webbing and generates a seat belt tension on the webbing. The method includes applying a voltage to the motor to retract the webbing and measuring an electrical current during the application of the voltage. From the measurements, a maximum value of the electrical current is determined, and a seat belt tension is determined based upon the maximum value of the electrical current.

An embodiment of an apparatus for determining a seat belt tension includes webbing forming a seat belt where the webbing is subject to a seat belt tension. The apparatus also includes a motor coupled to the webbing for generating seat belt tension on the webbing, wherein the motor is electrically coupled to by a controller that applies voltage to the motor and measures motor current. From the current measurements, a maximum value of the motor current is determined corresponding to the seat belt tension.

Further features and advantages of the invention will appear more clearly on a reading of the following detail description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
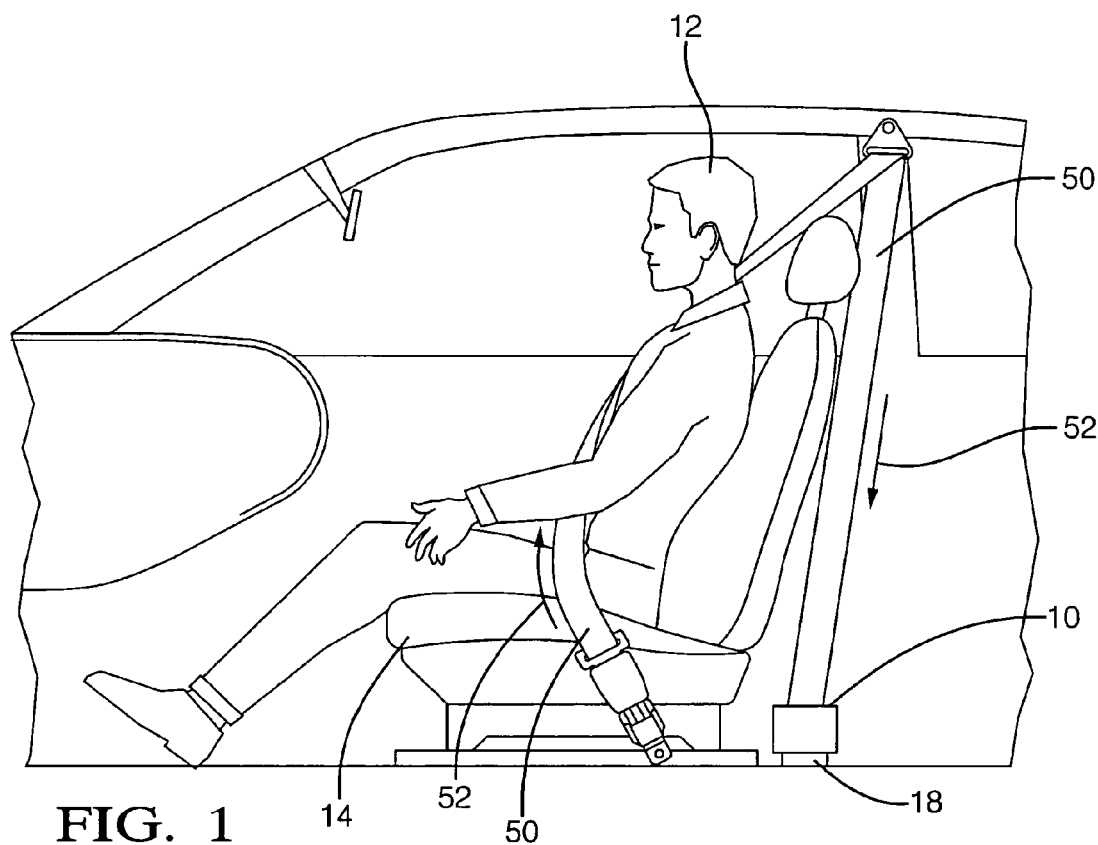
FIG. 1 is a side elevation view of an environment for a seat equipped with a motorized seat belt apparatus of a type preferred in the practice of this invention.

In accordance with a preferred embodiment of the invention, FIG. 1 shows occupant 12 positioned in vehicle seat 14 within a vehicle (not shown). The occupant is restrained in the seat by a motorized seat belt apparatus that includes webbing 50 and motorized retractor 10, whereby the seat belt apparatus is intended to keep the passenger in the seat in the event of a vehicle collision. The motorized retractor is securely coupled to the vehicle chassis through anchor 18, and operates to retract webbing 50 in direction 52, thereby generating a seat belt tension on the webbing to restrain the occupant.

Figure 2:
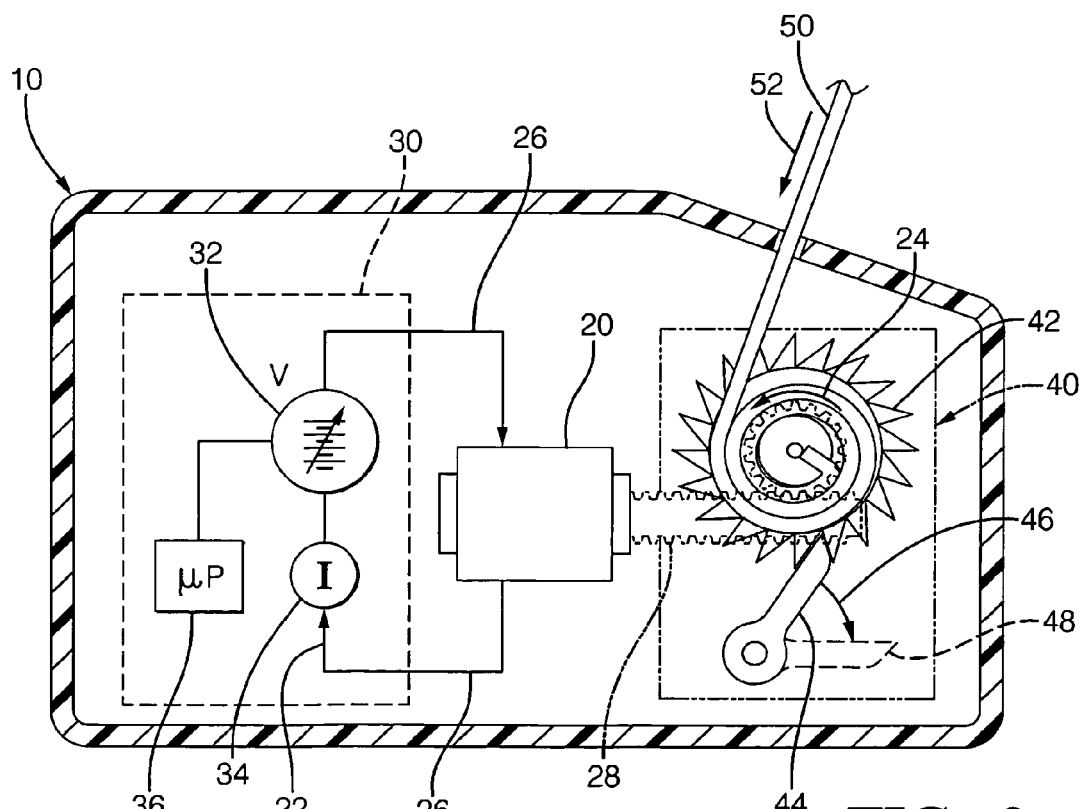
FIG. 2 is a view, partially schematic, showing details of the motorized seat belt apparatus in FIG. 1.

FIG. 2 shows some details within motorized reactor 10 including motor 20 electrically coupled to controller 30 through wires 26. Controller 30 includes a variable voltage source 32 controlled by microprocessor 36 for supplying current 22 through the wires to the motor. Current through the motor is measured by current sensor 34 and a signal from the current sensor is recorded by the microprocessor. Motor 20 is mechanically coupled to cinch 40 which is coupled to webbing 50. Current through the motor generates motor torque indicated by torque direction 24 and seat belt tension in retraction direction 52. The mechanical coupling between the motor and the cinch are indicated by dashed line 28 between motor 20 and cinch 40 and typically include mechanisms that transfer motor torque to seat belt tension. Such mechanical couplings typically include gears to multiply the torque of the motor, and a spool arranged to retract webbing in direction 52. The torque multiplication provided by the gears allows the use of a smaller motor while still generating adequate seat belt tension.

In this example, cinch 40 includes an index 42 and a pawl 44. When the cinch is in the engaged, the pawl is forcibly biased into an engaged position shown in FIG. 2, whereby cinch 40 allows retraction of webbing 50 in retraction direction 52, but prevents extraction of webbing 50 in a direction opposite direction 52 since pawl 44 prevents rotation of index 42 in the extraction direction. During retraction, the teeth of index 42 deflect pawl 44 in opposition to the biasing force and in the direction indicated by arrow 46. If index 42 rotates far enough, a tooth of the index will pass the tip of pawl 44, and the pawl will engage the next tooth. When pawl 44 is moved to and held in disengaged position 48, cinch 40 is disengaged, thereby allowing webbing 50 to be freely retracted and extracted. Engaging and disengaging cinch 40 can be performed manually by a person deploying the seat belt, or by a controller determining other information such as a determination that the seat is occupied by a child. The cinch may optionally include a webbing retractor spring (not shown) to retract any slack webbing when the seat belt is initially deployed before controller 30 is activated or in the event of the vehicle losing electrical power.

Figure 3:
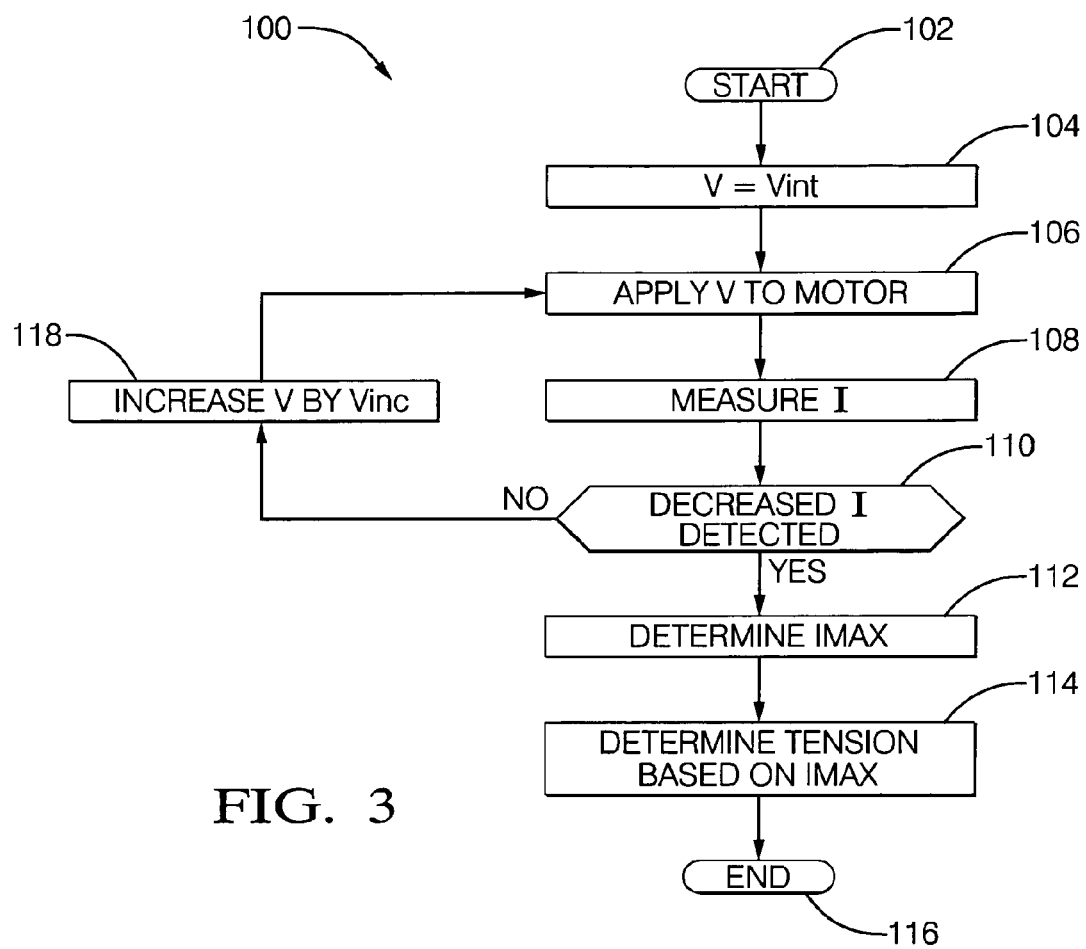
FIG. 3 is a flow chart of a method for operating the motorized seat belt apparatus in FIG. 1.

In accordance with this embodiment, FIG. 3 shows a method 100 for determining seat belt tension in a seat belt apparatus having a motorized retractor. The starting condition at step 102 is when the seat belt is deployed to restrain an occupant, cinch 40 is engaged, and tension has been established the webbing by either manually feeding the webbing into the retractor or momentarily activating the motorized retractor. Step 104 sets the voltage level of voltage source 32 (V) to an initial value (VINT). Step 106 applies the present voltage value of V to motor 20. VINT is selected low enough so when applied, the current in the motor is insufficient to overcome the present seat belt tension on webbing 50 and allow motor 30 to move. An exemplary value of VINT is 2V for a vehicle having a 12V battery voltage.

Figure 4:
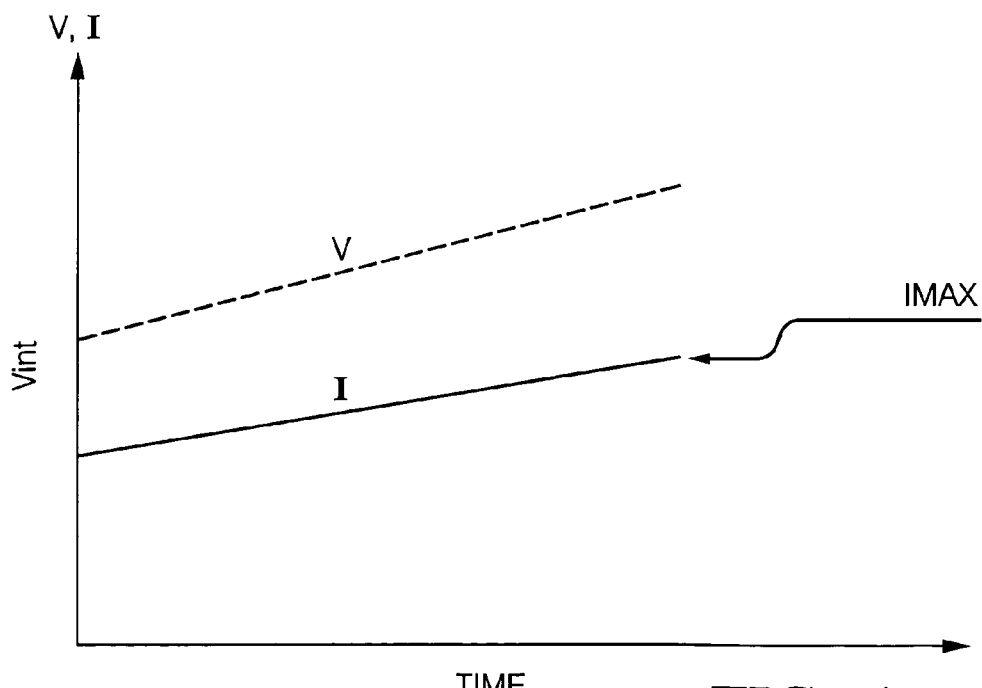
FIG. 4 is a graph showing voltage and current during operation in the motorized seat belt apparatus in FIG. 1.

After V is applied to the motor, step 108 measures a series of one or more values of the current (I) and stores the values for future use. The measurement and storage is performed by microprocessor 36 recording a signal value from current sensor 34 corresponding to the amount of current through the motor. Step 110 determines if a decrease in the signal from the current sensor has occurred thereby indicating that motor 20 has moved. This step is performed by microprocessor 36 comparing the most recent current sensor signal value to previously recorded values. Since VINT was selected so the motor would not move, the NO path is taken. Step 118 increases V by an incremental value (VINC) having an exemplary value of about 0.1V. The incrementally increased new value of V is applied to the motor, and the current is measured. This process of incrementing voltage and measuring current is repeated until motor 20 moves causing a decrease in current so the YES path is taken at step 110. The rate at which the voltage is incremented and the current is measured is dependent on the capability of the controller and the inertia of the mechanical portions of the motorized seat belt retractor. An exemplary rate for incrementing the voltage is about 100 Hz. The value of VINC and the increment rate selected so the period of time necessary to perform a seat belt tension determination is suitable, about 1 second for example. The decrease in current indicates that the motor moved so a maximum current (IMAX) is determined in step 112 to be the current just prior to the decrease in current as shown in FIG. 4.

Seat belt tension corresponding to the maximum value of electrical current is determined in step 114. The relationship between maximum current and seat belt tension can be based on an equation or a look-up table. The determination can also provide compensation for various conditions such as changes in mechanical advantage due to changes in the amount of webbing on a webbing spool or stiffness of the webbing due to changes in temperature and age.

Step 116 indicates the end of this embodiment of the steps for determining seat belt tension. The sequence of steps can be repeated on a periodic basis for periodically determining seat belt tension or verifying that the seat belt tension has not changed. An exemplary repetition period is every 15 seconds. Periodically determining the seat belt tension with the cinch engaged is, for example, particularly useful when a child seat is held in place by the seat belt and shifting of the child seat position could lead to a decrease in seat belt tension.

While not limited to any particular theory, it is believed that when the motor is rotating and moving in a direction cooperating with the torque induced by a current, the motion causes the motor to generate back-EMF. Back-EMF has a voltage polarity that opposes the voltage being applied to the motor and is effective to reduce the amount of current flowing through the motor for a given applied voltage. Thus, estimating seat belt tension based on applied voltage will not include any compensation for back-EMF so will not accurately determine seat belt tension. By monitoring current and determining a maximum current, it can be determined if the motor is moving. The transition from a motor not moving to a motor moving can be detected by observing a decrease in motor current even though the voltage applied to the motor has not decreased. Furthermore, estimating seat belt tension based on voltage measurement does not account for changes in motor coil resistance due to changes in temperature or the effect of age and wear on brush contact resistance. Motor current inherently includes compensation for changes in motor coil resistance and changes in brush contact resistance, so therefore provides a more reliable basis for measuring seat belt tension.

Referring again to FIG. 2, cinch 40 and the mechanical coupling between the cinch and the motor are configured so the amount of motor motion necessary to cause a detectable decrease in current does not cause the cinch to rotate enough to index and advance to the next tooth. Such a configuration allows the seat belt tension to be determined without further retraction of the webbing. Once the motor begins to move and the seat belt tension is determined, controller 30 can turn voltage source 32 off.

The previously described starting condition at step 102 in FIG. 3 indicated that tension had previously been established on the webbing. An alternate embodiment has a starting status where the seat belt has been deployed, but no initial tension has been established. This situation corresponds to when the occupant or child seat initially occupies a seat and the seat belt is buckled, but there is no tension on the seat belt. For this starting status, the controller applies a voltage to the motor sufficient to move the motor and retract the seat belt, and the motor current is monitored. As the motor stalls due to increasing seat belt tension, the motor current will increase to a maximum value. In this example, the controller is not looking for the motor current to stop rising and remain constant for a period of time, 0.5 seconds for example.

Thus, a method and apparatus for measuring seat belt tension on a webbing in a seat belt assembly that includes a retractor motor is provided. The apparatus includes a controller to apply a variable voltage to the retractor motor so the tension on the seat belt can be varied, and measures motor current to make a more reliable determination of seat belt tension. The method compares a series of motor current measurements for making a determination that the motor is or is not moving and determine seat belt tension based on a maximum current. The maximum current occurs just prior to a decrease in current where the decrease in current indicates that the motor has started moving. Thus, the apparatus and method provide a reliable determination of seat belt tension without the using a separate seat belt tension sensor or retractor motor motion.

While this invention has been described in terms of the preferred embodiments thereof, it is not intended to be so limited, but rather only to the extent set forth in the claims that follow. For example, it is to be appreciated that different kinds of transistors and devices other than transistors could provide adequate performance and different advantages.

We claim:

1. A method for determining seat belt tension in a motorized seat belt apparatus comprising a webbing and a motor coupled to the webbing for retracting the webbing and generating a seat belt tension on the webbing, whereby the seat belt tension is generated on the webbing when the seat belt apparatus is deployed to restrain an occupant, said method comprising:
   applying a voltage to the motor to retract the webbing, wherein the voltage increases at a predetermined ramp rate;
   measuring an electrical current during the application of the voltage to detect a decrease of electrical current, wherein the decrease of electrical current indicates an initiation of the motor moving to retract the webbing;
   determining a maximum value of the electrical current; and
   determining the seat belt tension based upon the maximum value.

2. The method in accordance with claim 1, wherein determining the maximum value is based on detecting a decrease in the value of electrical current.

3. The method in accordance with claim 1, said seat belt apparatus further comprising a cinch coupled to the webbing, said method further comprising:
   engaging the cinch to maintain the webbing in a retracted position.

4. The method in accordance with claim 3, wherein determining the maximum value is based on not detecting a decrease in the value of electrical current, thereby determining that the tension on the webbing is greater than a tension threshold.

5. The method in accordance with claim 3, wherein determining the maximum value includes determining the electrical current value immediately preceding the decrease of electrical current.

6. The method in accordance with claim 1, wherein the step of applying the voltage occurs after the seat belt apparatus is deployed to restrain an occupant and an initial seat belt tension is established.

7. The method in accordance with claim 1, wherein the determined tension provides an occupant classification for selecting a status of an airbag system.

8. A seat belt apparatus effective to monitor seat belt tension comprising:
   a webbing having a seat belt tension;
   a motor coupled to the webbing and effective to retract the webbing; and
   a controller comparing a variable voltage source effective to apply a voltage to the motor, wherein the voltage increases at a predetermined ramp rate, and a current sensor adapted to measure a motor current to detect a decrease of electrical current, wherein the decrease of electrical current indicates an initiation of the motor moving to retract the webbing, wherein a maximum value of the motor current is indicative of the seat belt tension.

9. The apparatus in accordance with claim 8, further comprising a cinch for allowing seat belt retraction and selectively preventing seat belt extraction.

10. The apparatus in accordance with claim 8, wherein the controller determines the maximum value by detecting a decrease in motor current when the voltage is not decreasing, whereby the maximum value immediately precedes the decrease.

11. The apparatus in accordance with claim 8, wherein the controller determines that the motor is not moving by detecting that the current is not increasing when the voltage is not changing, thereby determining the maximum value.

* * * * *